United States Patent
Huang (10) Patent No.: US 12,273,378 B2
(45) Date of Patent: Apr. 8, 2025

(54) DENIAL OF SERVICE RESPONSE TO THE DETECTION OF ILLICIT SIGNALS ON THE IN-VEHICLE COMMUNICATION NETWORK

(71) Applicant: Waymo LLC, Mountain View, CA (US)

(72) Inventor: TsengChan Stephan Huang, Milpitas, CA (US)

(73) Assignee: Waymo LLC, Mountain View, CA (US)

( * ) Notice: Subject to any disclaimer, the term of this patent is extended or adjusted under 35 U.S.C. 154(b) by 81 days.

(21) Appl. No.: 17/377,256

(22) Filed: Jul. 15, 2021

(65) Prior Publication Data
US 2023/0017962 A1    Jan. 19, 2023

(51) Int. Cl.
*H04L 9/40* (2022.01)

(52) U.S. Cl.
CPC .............................. *H04L 63/1458* (2013.01)

(58) Field of Classification Search
CPC .................................................. H04L 63/1458
See application file for complete search history.

(56) References Cited

U.S. PATENT DOCUMENTS

| | | | |
|---|---|---|---|
| 9,282,110 B2 | 3/2016 | Zhang et al. | |
| 11,354,406 B2 | 6/2022 | Juliato et al. | |
| 11,651,632 B2* | 5/2023 | Pirwani | G07C 5/0808 |
| | | | 701/29.3 |
| 11,652,827 B2* | 5/2023 | Overby | H04L 63/1441 |
| | | | 726/23 |
| 2009/0177356 A1 | 7/2009 | Plawecki | |
| 2014/0143839 A1* | 5/2014 | Ricci | H04N 21/814 |
| | | | 726/4 |
| 2016/0182559 A1 | 6/2016 | Francy et al. | |
| 2016/0248805 A1 | 8/2016 | Burns et al. | |
| 2017/0063996 A1* | 3/2017 | Kaster | H04L 63/1441 |
| 2019/0191311 A1 | 6/2019 | O'Brien et al. | |
| 2019/0327273 A1 | 10/2019 | Bryson et al. | |
| 2019/0379682 A1 | 12/2019 | Overby et al. | |
| 2020/0035044 A1 | 1/2020 | Levy et al. | |
| 2020/0180653 A1* | 6/2020 | Chi | B60W 10/04 |
| 2020/0216097 A1 | 7/2020 | Galula et al. | |
| 2020/0314116 A1 | 10/2020 | Rodriguez Bravo et al. | |
| 2021/0044612 A1 | 2/2021 | Kawauchi et al. | |
| 2021/0067528 A1 | 3/2021 | Tasaki et al. | |

(Continued)

FOREIGN PATENT DOCUMENTS

JP    2021033975 A    3/2021

OTHER PUBLICATIONS

Hamada Y, Inoue M, Adachi N, Ueda H, Miyashita Y, Hata Y. Intrusion detection system for in-vehicle networks. SEI Tech. Rev. (88). Apr. 2019:76-81.

(Continued)

*Primary Examiner* — Stephen T Gundry
(74) *Attorney, Agent, or Firm* — Lowenstein Sandler LLP (57) ABSTRACT

An in-vehicle communication network of a vehicle is monitored. An illicit signal is detected on the in-vehicle communication network. Whether the illicit signal satisfies a threshold severity condition is determined. A denial of service (DoS) operation with respect to at least part of the in-vehicle communication network is performed responsive to determining that the illicit signal satisfies the threshold severity condition.

20 Claims, 4 Drawing Sheets

(56) References Cited

U.S. PATENT DOCUMENTS

| | | | |
|---|---|---|---|
| 2021/0101618 A1 | 4/2021 | Levy et al. | |
| 2021/0114606 A1* | 4/2021 | Alvarez | G06N 3/047 |
| 2022/0198926 A1* | 6/2022 | Montemurro | G08G 1/096783 |
| 2022/0201000 A1* | 6/2022 | Kim | H04W 12/60 |
| 2022/0204028 A1* | 6/2022 | Xu | B60W 60/005 |
| 2022/0216995 A1* | 7/2022 | Cain, Jr. | G06F 21/44 |
| 2022/0234589 A1* | 7/2022 | Cserna | B60W 40/06 |
| 2022/0242419 A1* | 8/2022 | Davidovich | B60W 40/12 |
| 2022/0247681 A1* | 8/2022 | Melgangolli | H04L 12/40 |
| 2022/0250633 A1* | 8/2022 | Ansari | B60W 50/032 |
| 2022/0262135 A1* | 8/2022 | Wang | G05D 1/81 |
| 2022/0272122 A1 | 8/2022 | Kaabouch et al. | |
| 2022/0274593 A1* | 9/2022 | McFarland, Jr. | G08G 1/0133 |
| 2022/0279005 A1* | 9/2022 | Torisaki | H04L 63/1425 |
| 2022/0283796 A1* | 9/2022 | McFarland, Jr. | H04W 4/44 |
| 2022/0286858 A1 | 9/2022 | Saito et al. | |
| 2022/0289179 A1* | 9/2022 | Thomas | B60W 60/0027 |
| 2022/0289198 A1* | 9/2022 | Schmitt | B60W 60/00186 |
| 2022/0289199 A1* | 9/2022 | Sun | B60W 50/10 |
| 2022/0297719 A1* | 9/2022 | Mittal | G08G 1/0133 |
| 2022/0303305 A1* | 9/2022 | Shin | H04L 41/065 |
| 2022/0319310 A1* | 10/2022 | Duggal | G07C 5/008 |
| 2022/0319329 A1* | 10/2022 | Kim | B60W 40/04 |
| 2022/0327871 A1* | 10/2022 | Pirwani | G06Q 10/08 |
| 2022/0332338 A1* | 10/2022 | Patne | B60W 30/182 |
| 2022/0332350 A1* | 10/2022 | Jha | B60W 60/0017 |
| 2022/0334592 A1* | 10/2022 | McFarland, Jr. | G08G 1/0141 |
| 2022/0334818 A1* | 10/2022 | McFarland, Jr. | G06Q 10/063 |
| 2022/0338012 A1* | 10/2022 | Monteuuis | H04W 12/106 |
| 2022/0345861 A1* | 10/2022 | Ling | G08B 25/016 |
| 2022/0358836 A1* | 11/2022 | Baek | G08G 1/093 |
| 2022/0365530 A1* | 11/2022 | Foster | G05D 1/0022 |
| 2022/0365540 A1* | 11/2022 | Rosales | G01C 21/3407 |
| 2022/0374515 A1* | 11/2022 | Bridges | H04L 12/40026 |
| 2022/0375284 A1* | 11/2022 | McFarland, Jr. | B60K 35/00 |
| 2022/0383750 A1* | 12/2022 | Sharma Banjade | G08G 1/166 |
| 2022/0388505 A1* | 12/2022 | Sharma Banjade | G08G 1/005 |
| 2022/0388530 A1* | 12/2022 | Patne | B60W 60/0018 |
| 2022/0392342 A1* | 12/2022 | Fields | B60Q 9/008 |
| 2022/0394053 A1* | 12/2022 | Sorani | G06F 21/57 |
| 2022/0394784 A1* | 12/2022 | Hwang | H04W 4/90 |
| 2022/0398149 A1* | 12/2022 | McFarland, Jr. | G06F 11/0751 |
| 2022/0398911 A1* | 12/2022 | Patne | B60R 25/245 |
| 2022/0407872 A1* | 12/2022 | Min | H04L 63/145 |
| 2022/0408245 A1* | 12/2022 | Maass | H04W 4/40 |
| 2022/0408246 A1* | 12/2022 | Maass | H04W 12/106 |
| 2022/0417472 A1* | 12/2022 | Mobbs | G05D 1/0231 |
| 2023/0019817 A1* | 1/2023 | Huang | H04L 63/0227 |
| 2023/0023478 A1* | 1/2023 | Hwang | H04W 4/38 |
| 2023/0067689 A1* | 3/2023 | Hwang | H04W 72/0453 |
| 2023/0087311 A1* | 3/2023 | Soffer | H04L 63/1416 |
| 2023/0095384 A1* | 3/2023 | Sharma Banjade | G08G 1/096725 / 701/301 |

OTHER PUBLICATIONS

Han K, Weimerskirch A, Shin KG. Automotive cybersecurity for in-vehicle communication. IQT Quarterly. 2014;6(1):22-5.

El-Rewini, Z., Sadatsharan, K., Selvaraj, D.F., Plathottam, S.J. and Ranganathan, P., 2020. Cybersecurity challenges in vehicular communications. Vehicular Communications, 23, p. 100214.

Dibaei M, Zheng X, Jiang K, Maric S, Abbas R, Liu S, Zhang Y, Deng Y, Wen S, Zhang J, Xiang Y. An overview of attacks and defences on intelligent connected vehicles. arXiv preprint arXiv:1907.07455. Jul. 17, 2019.

Cho, K.T., 2018. From Attack to Defense: Toward Secure In-vehicle Networks (Doctoral dissertation).

Oyler, A. and Saiedian, H., 2016. Security in automotive telematics: a survey of threats and risk mitigation strategies to counter the existing and emerging attack vectors. Security and Communication Networks, 9(17), pp. 4330-4340.

* cited by examiner

DENIAL OF SERVICE RESPONSE TO THE DETECTION OF ILLICIT SIGNALS ON THE IN-VEHICLE COMMUNICATION NETWORK

TECHNICAL FIELD

The instant specification generally relates to vehicles. More specifically, the instant specification relates to implementing a denial of service countermeasure in response to the detection of illicit signals on an in-vehicle communication network.

BACKGROUND

Vehicles, such as automotive vehicles, commonly include computers, microcontrollers, and other electronic components that sense conditions relevant to the operation of the vehicle, and that perform a variety of functions necessary for the vehicle's operation. For example, an autonomous vehicle (AV) operates by sensing an outside environment with various sensors and charting a driving path through the environment based on the sensed data, Global Positioning System (GPS) data, and road map data. Many vehicles may include dozens of electronic control units (ECUs), with each ECU controlling different aspects of one or more electrical or electromechanical subsystems of the vehicle. For example, various ECUs may be provided for engine control, powertrain control, transmission control, brake control, and speed control. Most ECUs, however, do not operate in isolation from other vehicle systems. ECUs rely on the ability to communicate with other vehicle systems, so that activities may be coordinated across the vehicle and each ECU may receive data necessary for its operations (e.g., sensor data). For this reason, many vehicles include an in-vehicle communication network, such as a controller area network (CAN) bus. ECUs are communicably coupled to the in-vehicle communication network, and messages sent between various ECUs are transmitted and received over the in-vehicle communication network. The in-vehicle communication network thus serves an important role in the operation of modern vehicles by allowing for communication between the electrical control units (and corresponding peripherals and sensors) disposed throughout the vehicle. Nonetheless, the in-vehicle communication network may also be exploited by attackers or other entities who seek to compromise the security of communications at the in-vehicle communication network.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure includes a method, comprising: monitoring an in-vehicle communication network of a vehicle; detecting an illicit signal on the in-vehicle communication network; determining whether the illicit signal satisfies a threshold severity condition; and responsive to determining that the illicit signal satisfies the threshold severity condition, performing a denial of service (DoS) operation with respect to at least part of the in-vehicle communication network.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

The disclosure is illustrated by way of examples, and not by way of limitation, and can be more fully understood with references to the following detailed description when considered in connection with the figures, in which.

DETAILED DESCRIPTION

The transmission of illicit signals on an in-vehicle communication network can lead to potentially dangerous consequences for a vehicle. For example, an ECU may transmit time-sensitive messages to other ECUs on the in-vehicle communication network with instructions necessary to properly maneuver the vehicle (e.g., braking, steering, or acceleration control commands). If an attack node injects illicit signals on the in-vehicle communication network (e.g., an attack node transmits messages with altered data at a faster rate than a non-attack node or an attack node interjects itself between a transmitting and receiving node(s) (man-in-the-middle attack) and alters the data that passes through the attack node), the attack node may alter the message content sufficiently to change course of the vehicle. A sophisticated attacker may even alter the content of messages to cause recipient nodes to process illegitimate data without the messages being discarded. For example, attackers may also "spoof" the identity of a legitimate node by transmitting messages on the in-vehicle communication network using identifiers (e.g., source identifiers) that have been reserved for the legitimate node.

Some systems address malicious attacks by introducing custom hardware that attempts to cancel illicit signals at the hardware level. The introduction of new hardware is not only cost prohibitive, but also introduces potential reliability issues that can be particularly troublesome in automotive design, which emphasizes safety and reliability. Other systems address malicious attacks by introducing a hardware and software technique that uses cryptographic keys for the authentication of messages transmitted on the in-vehicle communication network. Such a system can be very cumbersome and costly to implement due, at least in part, to the time-sensitive nature of the message delivery on an in-vehicle communication network and the latency caused by the authentication of messages. Further, such a system may be a partial authentication system where only some of the nodes and messages transmitted on the in-vehicle communication network are authenticated, which can make the system vulnerable to some types of malicious attacks. Aspects of the disclosure can be used to complement or work with a system implementing message authentication and help mitigate adverse impacts on safety in the vehicle environment due to the illicit signal by achieving a worst case outcome that is at least no different (and likely better) than a full authentication system where all the nodes and messages transmitted on the in-vehicle communication network are authenticated.

Aspects of the disclosure address the above challenges along with others, by detecting an illicit signal on the in-vehicle communication network and in response, performing one or more countermeasures that can include a denial of service operation. A denial of service operation can refer to a countermeasure operation (e.g., action, process, technology, device, or system that serves to prevent or mitigate the effects of an attack against the in-vehicle communication network) that disables communication on at least part of the in-vehicle communication network affected by the illicit signal. For example, the denial of service operation can disable at least part of the in-vehicle communication network affected by the illicit signal by for example, powering down an affected node or flooding the affected part of the in-vehicle communication network with messages to prevent the communication of additional illicit signals between nodes in at least the affected part of the in-vehicle communication network. In some implementations, the denial of service operation can cause the vehicle to reduce functionality, which can be the safer alternative to the potential outcome of a sustained attack.

For example, an attacker could cause a vehicle to turn and accelerate into oncoming traffic at a high rate of speed. A denial of service operation performed by the vehicle can disable the affected part of the in-vehicle communication network causing the vehicle to disengage the powertrain and coast to the side of the road.

In some implementations, the vehicle, such as an autonomous vehicle (AV), can have one or more redundant systems. The redundant systems of a vehicle can be particularly useful for safety-critical systems such as a braking system, a steering system, and an AV control system. In some implementations, a particular system in part of the in-vehicle communication network can be disabled in response to a detection of an illicit signal and a corresponding redundant system can be enabled in another part of the in-vehicle communication network. By timely enabling the redundant system, the AV can maintain continuity in vehicle operation and operate as if no disruption (e.g., attack) had occurred.

In some implementations, the in-vehicle communication network can be monitored for illicit signals. For example, a receiver node of the in-vehicle communication network can receive a message transmitted on an in-vehicle communication network and determine a source identifier in the message. The source identifier can identify the source node that transmitted the message. In some cases, a source identifier can be unique to each node. If the receiver node identifies its own source identifier in a message and determines that it did not transmit the message, the receiver node can further determine that the message is an illicit signal.

In some implementations, a node of the in-vehicle communication network, such as the AV control system, can monitor a vehicle action (e.g., steering, braking, etc.) that is performed by the vehicle based on control commands (e.g., instructions) issued by the AV control system. If the performance of the vehicle action exceeds a threshold tolerance (e.g., the vehicle is accelerating past the instructed speed above a threshold amount), the AV control system can infer that an illicit signal is being transmitted on the in-vehicle communication network.

In some implementations, the vehicle can perform a graduated response to the detection of an illicit signal that depends on the level of severity of the attack. The vehicle can evaluate one or more characteristics of the illicit signal and compare the one or more characteristics to one or more severity conditions that correspond to different levels of severity. Depending on the one or more severity condition(s) that are satisfied, the vehicle can perform a commensurate level of response. For example, if the vehicle determines that illicit signal affects the window electronics (lower level of severity), the vehicle may choose to further monitor the affected system for a predetermined amount of time. If the illicit signal affects the braking system (higher level of severity), the vehicle may choose to perform a denial of service operation.

Therefore, advantages of the systems and methods implemented in accordance with some aspects of the disclosure include, but are not limited to, improving the operation and safety of a vehicle, and in particular an AV by implementing a denial of service operation as a countermeasure to illicit signals, as described in more detail herein.

An illicit signal can refer to an electric signal, such as a message, that has been created or modified by an unauthorized third party (e.g., with a presumably malicious purpose).

An in-vehicle communication network (also referred to as an "in-vehicle network" herein) can refer to a data communication system, such as an automotive data communication system that is used to electrically connect nodes, such as electronic control units or other electronic devices. The connected nodes can be part of the in-vehicle communication network. In some implementations, the in-vehicle communication network can include a linear bus or a complex network implementing one or more gateways (e.g., gateway devices).

An electronic control unit (ECU) can refer to a system, such as an embedded system, that controls one or more electrical systems, subsystems, or peripheral devices (e.g., sensors or actuators) in a vehicle.

It can be noted that references to autonomous vehicles in the disclosure are provided for purposes of illustration, rather than limitation. Aspects of the disclosure can be applied to autonomous vehicles (e.g., partially or fully autonomous) as well as non-autonomous vehicles. It can also be noted that reference to automotive vehicles is used for the purpose of illustration, rather than limitation. Aspects of the disclosure can be applied to any type of vehicle, including but not limited to heavy machinery (e.g. agricultural tractors, graders, excavators, loaders, material handlers, mining equipment, etc.), planes, trains, or other vehicles.

Figure 1:
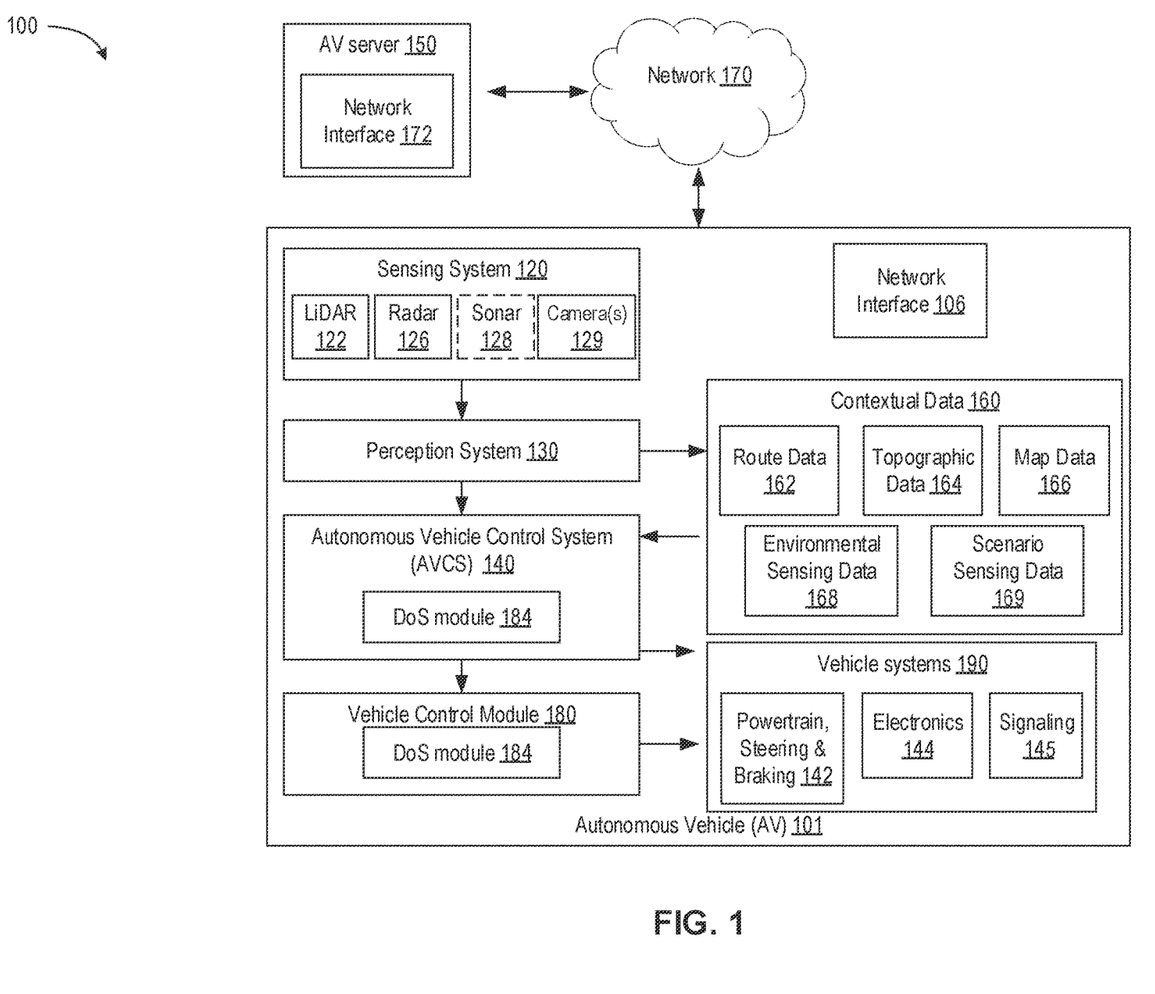
FIG. 1 is a diagram illustrating components of an example architecture of a system including an autonomous vehicle (AV) that implements denial of service operations, in accordance with some implementations of the disclosure.

FIG. 1 is a diagram illustrating components of an example architecture 100 of a system including an autonomous vehicle (AV) 101 that implements denial of service operations, in accordance with some implementations of the disclosure. Autonomous vehicles can include any motor vehicles, such as cars, trucks, tractors (with or without trailers), buses, motorcycles, all-terrain vehicles, recreational vehicles, any specialized farming or construction vehicles, and the like), or any other self-propelled vehicles capable of being operated in a self-driving mode (without a human input or with a reduced human input). Autonomous vehicles can include vehicles with various levels of autonomy, such as level 2 (partial autonomy) through level 5 (full autonomy). Autonomous vehicles can include vehicles using an internal combustion engine (e.g., gas engine, diesel engine, etc.), an electric engine (motor), or combination thereof (e.g., hybrid AV). AV 101 can be capable of traveling on paved and/or unpaved roadways, off-road, on various surfaces encountered on farming (or other agricultural) land, within a driving environment (including indoor environment) of an industrial plant, and so on.

AV 101 can include a sensing system 120. The sensing system 120 can include various electromagnetic (e.g., optical) and non-electromagnetic (e.g., acoustic) sensing subsystems and/or devices that can be used in object sensing to facilitate autonomous driving, e.g., distance sensing, velocity sensing, acceleration sensing, rotational motion sensing, and so on. For example, optical sensing can utilize a range of light visible to a human eye (e.g., the 380 to 400 nm wavelength range), the UV range (below 380 nm), the infrared range (above 400 nm), the radio frequency range (above 1 m), etc. In implementations, "optical" can include any other suitable range of the electromagnetic spectrum.

The sensing system 120 can include one or more radar units 126, which can be any system that utilizes radio or microwave frequency signals to sense objects within the driving environment of the AV 101. The radar unit(s) can be configured to sense both the spatial locations of the objects (including their spatial dimensions) and their velocities (e.g., using the Doppler shift technology), such as translational velocities and angular (rotational) velocities. The sensing system 120 can include one or more LiDAR sensors 122 (e.g., a LiDAR rangefinders), which can be laser-based units capable of determining distances (e.g., using ToF technology) to the objects in the environment around AV 101. For example, LiDAR(s) 122 can emit one or more laser signals (pulses) that travel to an object and then detect arrived signals reflected from the object. By determining a time delay between the signal emission and the arrival of the retro-reflected waves, a ToF LiDAR can determine the distance to the object. LiDAR(s) 122 can emit signals in various directions to obtain a wide view of the outside environment. LiDAR(s) 122 can utilize wavelengths of electromagnetic waves that are shorter than the wavelength of the radio waves and can, therefore, provide a higher spatial resolution and sensitivity compared with the radar unit 126. In some implementations, LiDAR(s) 122 can be (or include) coherent LiDAR(s), such as a frequency-modulated continuous-wave (FMCW) LiDAR(s). FMCW LiDAR(s) (or some other coherent LiDAR sensors) can use optical heterodyne detection for instant velocity determination. LiDAR(s) 122 can include one or more laser sources producing and emitting signals and one or more detectors of the signals reflected back from the objects, one or more spectral filters to filter out spurious electromagnetic waves having wavelengths (frequencies) that are different from the wavelengths (frequencies) of the emitted signals, one or more directional filters (e.g., apertures, diffraction gratings, and so on) to filter out electromagnetic waves that arrive at the detectors along directions different from the directions of the emitted signals, and other components that can enhance sensing capabilities of the LiDAR(s) 122. In some implementations, LiDAR(s) 122 can ensure a 360-degree view in a horizontal direction and up to 90 degrees in the vertical direction.

Sensing system 120 can further include one or more cameras 129 to capture images of the driving environment. The images can be two-dimensional projections of the driving environment (or parts of the driving environment) onto a projecting plane (flat or non-flat, e.g. fisheye) of the cameras. Some cameras 129 of sensing system 120 can be video cameras configured to capture a continuous (or quasi-continuous) stream of images of the driving environment. Sensing system 120 can also include one or more sonars 128, which can be ultrasonic sonars, in some implementations.

The sensing data obtained by sensing system 120 can be processed by a perception system 130 that can be configured to detect and track objects in the driving environment and to identify the detected objects. For example, perception system 130 can analyze images captured by cameras 129 and can be capable of detecting traffic light signals, road signs, roadway layouts (e.g., boundaries of traffic lanes, topologies of intersections, designations of parking places, and so on), presence of obstacles, and the like. Perception system 130 can further receive the LiDAR sensing data (coherent Doppler data and incoherent ToF data) to determine distances to various objects in the environment and velocities of such objects. In some implementations, perception system 130 can use the LiDAR data in combination with the data captured by the camera(s) 129. In one example, the camera(s) 129 can detect an image of a rock partially obstructing a traffic lane. Using the data from the camera(s) 129, the perception system 130 can be capable of determining the angular size of the rock, but not the linear size of the rock. Using the LiDAR data, perception system 130 can determine the distance from the rock to the AV and, therefore, by combining the distance information with the angular size of the rock, perception system 130 can determine the linear dimensions of the rock as well.

In another implementation, using the LiDAR data, perception system 130 can determine how far a detected object is from the AV and can further determine the component of the object's velocity along the direction of the AV's motion. Furthermore, using a series of quick images obtained by the camera, perception system 130 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction.

Perception system 130 can further receive information from a positioning subsystem that may include a GPS transceiver (not shown) configured to obtain information about the position of the AV relative to Earth and its surroundings. The positioning subsystem can use the positioning data (e.g., GPS data and/or inertial measurement data) in conjunction with the sensing data to help accurately determine location of the AV with respect to fixed objects of the driving environment, such as roadways, lane boundaries, intersections, sidewalks, crosswalks, road signs, surrounding buildings, and so on, locations of which can be provided by map information accessible by perception system 130. In some implementations, perception system 130 can receive non-electromagnetic data, such as sonar data (e.g., ultrasonic sensor data), temperature sensor data, pressure sensor data, meteorological data (e.g., wind speed and direction, precipitation data), or other environmental monitoring data.

In some implementations, the perception system 130 can provide, generate or be used to help generate at least some contextual data 160. Contextual data 160 can include one or more of route data 162, topographic data 164, map data 166, environmental sensing data 168, scenario sensing data 169, or GPS data (not shown). Herein "route" shall refer to a sequence of physical locations (e.g., geographic markers) that can be traveled by a target vehicle between a starting point ("start") and a destination point ("destination"). The start and/or the destination need not be the initial and final locations of the vehicle in the driving mission, but can be any two points (e.g., A and B) along such a mission. Accordingly, "mission" herein shall refer to any portion of the overall driving task. Route data 162 can include information about the starting point, intermediate points and destination point of the route (e.g., longitude and latitude information of points along the route) and include physical characteristics of various routes. "Trajectory" shall refer to driving settings, specified for various locations along the route, and shall include speed/throttle/brake/etc. control that determine progression of the vehicle along the route. For example, a trajectory can include throttle settings, T(L) as a function of the location L along the route, target speed of the vehicle S(L), gear selection sequences, and so on. The location L can be identified by the distance travelled, GPS coordinates, road markers (e.g., mileposts), or a combination thereof, or in any other way. Topographic data 164 can include information about the topography of the roads (e.g., grade and radius of curvature) or topography along the route. Map data 166 can include information about the road network along the route, such as the quality of road surfaces, number of lanes, speed limits, type and number of exit ramps, availability of gas stations, and so on. Map data 166 can also include traffic data that includes information about historic traffic patterns or current traffic conditions along or near the route. Environmental sensing data 168 can be the data obtained by sensing system 120 and/or include data from the perception system 130 that has been generated using the data from the sensing system 120. For example, environmental sensing data 168 can include information describing the environment near or around the AV 101 (e.g., position of other vehicles, obstacles, or other elements with respect to the AV 101). Scenario sensing data 169 can include predicative data generated by using other contextual data, such as environmental sensing data 168 to make predictions about future scenarios. For example, the environmental sensing data 168 can indicate that another vehicle is in an adjacent lane and has an engaged turn signal. The corresponding scenario sensing data 169 can include information indicating a prediction that the vehicle will enter the same lane that AV 101 currently occupies in 3 seconds and will be approximately 3 meters in front of the AV 101 at that time.

The data generated by perception system 130 as well as various additional data (e.g., contextual data 160, GPS data processing module, and the like) can be used by an autonomous driving system, such as AV 101 control system (AVCS) 140. The AVCS 140 can include one or more algorithms that control how AV 101 is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as vehicle systems 190 (e.g., the powertrain, steering and braking 142, vehicle electronics 144, and signaling 145), vehicle control module (VCM) 180, and other systems and components not explicitly shown in FIG. 1. The powertrain, steering and braking 142 can include an engine (internal combustion engine, electric engine (motor), and so on), transmission, differentials, axles, wheels, steering mechanism, braking mechanism, and other systems. The vehicle electronics 144 can include an on-board computer, engine management, ignition, communication systems, carputers, telematics, in-car entertainment systems, and other systems and components. The signaling 146 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, steering and braking 142 (or signaling 146), whereas other instructions output by the AVCS 140 are first delivered to the VCM 180, which can generate commands to the powertrain, steering and braking 142 and/or signaling 145.

In one example, the AVCS 140 can determine that an obstacle identified by perception system 130 is to be avoided by decelerating the vehicle until a safe speed is reached, followed by steering the vehicle around the obstacle. The AVCS 140 can output instructions to the powertrain, steering and braking 142 (directly or via the VCM 180) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions (e.g., control commands) to the powertrain, steering and braking 142 (directly or via the VCM 180) to resume the previous speed settings of the vehicle.

In some implementations, AVCS 140 can include a denial of service module 184 that can interface with VCM 180, and in particular with another instance of denial of service module 184 of the VCM 180.

In some implementations, VCM 180 can control the vehicle systems 190 at the behest of the AVCS 140. AVCS 140 can send a control command, rather than directly to the vehicle systems 190, to VCM 180. VCM 180 can execute the control command by actuating one or more of the vehicle systems 190.

In some implementations, AV 101 can be implemented without VCM 180. In other implementations, a vehicle, such as a non-autonomous vehicle can be implemented with VCM 180 and without AVCS 140. In such implementations, a human being as a driver can perform at least some of the operations corresponding to the operations performed by one or more of perception system 130 or sensing system 120.

In some implementations, one or more of denial of service module 184 of AVCS 140 or denial of service module 184 of VCM 180 can perform one or more denial of service activities as described herein. For example, in some implementations, denial of service module 184 of AVCS 140, denial of service module 184 of VCM 180, or a combination thereof can monitor an in-vehicle communication network and detect an illicit signal on the in-vehicle communication network. Denial of service module 184 of AVCS 140, denial of service module 184 of VCM 180, or a combination thereof can determine that the illicit signal satisfies a threshold severity condition and responsive to the determination perform a denial of service operation with respect to at least part of the in-vehicle communication network. The operations of the denial of service module 184 is further described below.

In some implementations, VCM 180 can be a third-party VCM. A third party can refer to an entity, such as an enterprise or business (e.g., designer or manufacturer of the base vehicle) that is distinct from another entity, such as the entity converting the base vehicle into an AV. As noted above, in some implementations an entity can design or manufacture the base vehicle, including the VCM 180, and another entity can convert the base vehicle into an AV. In some implementations, the third-party VCM 180 is designed, produced, or controlled by an entity that is different from the entity that designed, produced, or has control over the AVCS 140. In some implementations, VCM 180 is not a third-party VCM. For instance, the VCM 180 can be a first-party element designed by the entity that converts the base vehicle to an AV. In cases where the AV is designed from the "ground up" as an autonomous vehicle, the VCM 180 and AVCS 140 can be designed by the same entity. In some implementations, the VCM 180 is integrated with the AVCS 140. For example, the VCM 180 can be designed as a "plug-in" or other software component that adds one or more features to the AVCS 140. For instance, the VCM 180 can be updated/upgraded (e.g., periodically or upon each startup of the AV 101) with new or improved features for the denial of service module 184 without updating/upgrading the entirety of the AVCS 140.

In some implementations, AVCS 140 can be the primary authority and/or component involved in planning and decision making on positioning and operation of the AV 101. The AVCS 140 can receive various contextual data, as illustrated by contextual data 160, and make decisions about the positioning of the AV 101 with respect to the external environment based on the contextual data 160. In some implementations, the AVCS 140 controls the position of the AV 101 based on a very strict tolerance (e.g., within a few centimeters from the requested position). For example, the AVCS 140 can evaluate the contextual data 160 and determine a position with respect to the external environment to move the AV 101. To control the positioning of the AV 101, AVCS 140 can send one or more control commands to the VCM 180 for execution by the VCM 180. In some implementations, to control the positioning of the AV 101, the AVCS 140 can send one or more control commands to one or more of the vehicle systems 190. In some implementations, the control commands can direct the VCM or one or more of the vehicle systems 190 to perform vehicle actions, such as braking, steering, and throttling, such that the corresponding components of the brake system, steering system, and powertrain, respectively are actuated in the performance of the vehicle actions. In some implementations, the VCM 180 of one or more of the vehicle systems 190 are expected to execute the control commands within the constraints (e.g. tolerance) imposed by the control commands such that the position of the AV as determined by the AVCS 140 can be controlled with precision.

For example, the AVCS 140 can send one or more control commands to the VCM 180. The VCM 180 can receive the one or more control commands from AVCS 140. In some implementations, the control commands can identify a vehicle action and/or constraints associated with the vehicle action. The vehicle action can refer, for example, to the movement or positioning of the AV and can be taken, for example, by one or more of the powertrain, steering, or braking systems. The constraints can refer, for example, to the parameters related to the vehicle action and/or the tolerance allowed by the AVCS 140 in executing the vehicle action at the given parameter value. For example, AVCS 140 can send a control command to apply brake pressure (e.g., vehicle action) of some amount (e.g., X pounds per square inch (PSI)) with a given tolerance (e.g. 0.1 percent (%)) (where the amount of brake pressure and tolerance are a constraint). VCM 180 can actuate the brakes of the AV to apply the amount of pressure within the prescribed constraints as identified by the control command. In another example, a control command indicates X amount of throttle that should be applied at time 0 with a tolerance of 0.1 percent, Y amount of throttle that should be applied at time 1 with a tolerance of 0.5 percent, and Z amount of throttle that should be applied at time 2 with a tolerance of 0.2 percent to maintain a speed of approximately 60 km/h during time 0 through time 2.

In some implementations, architecture 100 can also include AV server 150 to communicate relevant information to and receive relevant information from AV 101. For example, relevant information can include traffic information, weather information, route information, among other information. In some implementations, AV server 150 can be, at least at times, communicating with AV 101 via network 170. In some implementations, AV 101 can be connected to network 170 at most or all times. In some implementations, AV 101 can establish connections to network 170 intermittently, when an appropriate network signal is available. In some implementations, AV 101 can be connected to network 170 prior to stating the driving mission. Network 170 can use a wireless connection, such as a broadband cellular connection (e.g., 3G, 4G, 4G LTE, 5G, connection(s), and so on), a wireless local area network (WLAN), a wireless wide area network (WWAN), a wired connection, a satellite connection, or the like. Connection to network 170 can be facilitated via a network interface 106 (on the side of AV 101) and a network interface 172 (on the side of AV server 150). Network interfaces 106 and 172 can include antennas, network controllers, radio circuits, amplifiers, analog-to-digital and digital-to-analog converters, physical layers (PHY), media access control layers (MAC), and the like.

In some implementations, AV 101 can be implemented with one or more fully redundant or partially redundant systems or subsystems (not shown). A redundant system or subsystem can help AV 101 maintain operation in the case that a failure, such as a critical failure, occurs in a system or subsystem having a redundant counterpart. A redundant system or subsystem can perform the same or similar operations to a respective redundant counterpart system or sub-system. For example, the failure of the ACVS 140 may be a catastrophic failure without the implementation of a redundant ACVS. If ACVS 140 fails, AV 101 may engage the redundant ACVS and operate the vehicle using the redundant ACVS with little to no impact on the operation of the AV 101. In some implementations, at least one of one or more of the sensing system 120, perception system 130, AVCS 140, VCM 180, or vehicle systems 190 can include redundant features (e.g., system or subsystem). For the sake of brevity, a partially or fully redundant system or subsystem will be referred to as a redundant system in the following disclosure. It should be understood that a redundant system can refer to a partially redundant system, a fully redundant system, a partially redundant sub-system, or fully redundant sub-system, herein, unless otherwise described. An example of a redundant AV system is further described below with respect to FIG. 2.

Figure 2:
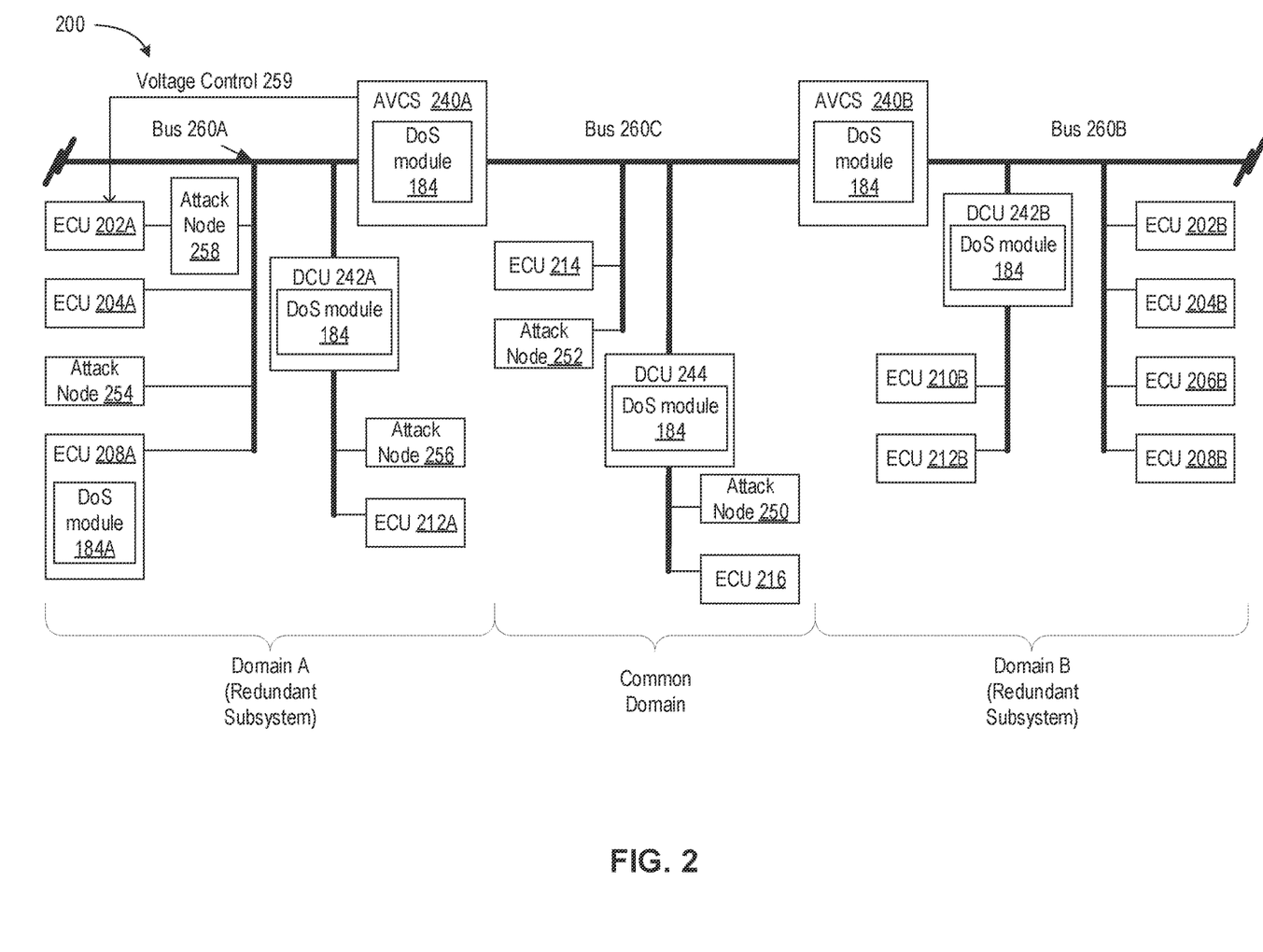
FIG. 2 is a diagram illustrating an in-vehicle communication network, in accordance with some implementations of the disclosure.

FIG. 2 is a diagram illustrating an in-vehicle communication network, in accordance with some implementations of the disclosure. Components of FIG. 1 are used to help describe aspects of FIG. 2.

In-vehicle communication network 200 includes various nodes such as one or more of one or more ECUs, one or more domain control units (DCUs), one or more attack nodes, or one or more autonomous vehicle control systems (AVCS).

In some implementations, an in-vehicle communication network can include one or more redundant systems. In-vehicle communication network 200 is shown with one or more redundant systems, illustrated by Domain A (e.g., redundant system(s) A) and Domain B (e.g., redundant system(s) B). For example, Domain A and Domain B can include redundant systems that are safety-critical systems. If one or more components of a system or an entire system fails in Domain A, the same or similar component(s) or system can be engaged or enabled in Domain B so that continuity of vehicle operation is achieved. In some implementations, the common domain represents systems or components that do not have redundant counterparts. In some implementations, the systems and components of the common domain can be shared between Domain A and Domain B.

In an illustrative example, in-vehicle communication network 200 can have redundant AVCSs, such as AVCS 240A and AVCS 240B that perform or are capable of performing the same or similar operations. Domain A can include one or more of a steering system, braking system, AVCS, power system, or sensor system (e.g. LiDAR, etc.). Domain B can include one or more redundant systems including one or more of a redundant steering system, redundant braking system, redundant AVCS, redundant power system, or redundant sensor system (e.g. LiDAR, etc.).

It can be noted that the redundant system(s) of in-vehicle communication network 200 are provided for illustration rather than limitation. In other implementations, no redundant or different redundant systems can be implemented on in-vehicle communication network 200.

The various nodes are communicatively coupled (e.g., by physical wire or cable) to one another by bus 260A, bus 260B, and bus 260C (generally referred to as "bus 260" herein). A bus, such as a vehicle bus, can refer to a specialized internal communications network that interconnects components (e.g., nodes) inside a vehicle. In some implementations, specialized vehicle protocols can be used on the bus 260 to implement vehicle control standards such as assurance of message delivery, of non-conflicting messages, of minimum time of delivery, of low cost, and of EMF noise resilience, as well as redundant routing and other characteristics that mandate the use of less common networking protocols.

In some implementations, bus 260 can include, at least in part, a controller area network (CAN) bus that comports with one or more of the ISO 11898 series of standards, such as ISO 11898-1 (data link layer), ISO 11898-2 (physical layer for high-speed CAN), ISO 11898-3 (physical layer for low-speed CAN), and CAN Flexible Data-Rate (e.g., CAN FD 1.0) specification. In some implementations, bus 260 may additionally or alternatively be based on other standards or specifications related to controller area networks. In some implementations, bus 260 is another type of multi-node bus other than CAN. For example, bus 260 may be a multi-master serial bus that allows wired nodes in a smart home to assert dominant and recessive signals to pull the bus 260 into one of two states in a similar manner to CAN. The nodes may contend for access to the bus 260 via an arbitration procedure that relies on dominant and recessive bit assertions, and a winning node may be granted a period of exclusivity to transmit its message without interference by other compliant nodes.

In some implementations, one or more systems or components of an in-vehicle communication network 200 can include a gateway device. For example, in some implementations one or more of AVCS 240A, AVCS 240B, DCU 242A, DCU 244, DCU 242B can operate as a gateway device. A gateway device can refer to a hardware device that acts as a "gate" between at least two communication networks or at least two parts of the same communication network. In some implementations, the gateway device can enable signals to be transmitted in and out of a particular network or part of a network. In some implementations, the gateway device can protect or isolate nodes within a communication network or within part of a communication network. The gateway device can be a node in the network.

It should be understood that illustrations of systems of in-vehicle communication network 200 as gateway devices are provided for illustration rather than for limitation. For example, in some implementations, ACVS 240A and ACVS 240B can both access components and systems of one or more of Domain A, Domain B, or Domain C with or without one or more of ACVS 240A or ACVS 240B configured or operating as a gateway device.

In some implementations, one or more nodes of in-vehicle communication network 200 are ECUs, such as ECU 202A, ECU 204A, ECU 208A, ECU 212A, ECU 214, ECU 216, ECU 202A, ECU 204B, ECU 206B, ECU 208B, ECU 210B and ECU 212B. In some implementations, any number of ECUs can be implemented on in-vehicle communication network 200. The ECUs of the in-vehicle communication network 200 can communicate with each other and other nodes on the in-vehicle communication network 200 via the bus 260. In some implementations, each ECU is independently controlled and maintains its own clock. In some implementations, although the ECUs of in-vehicle communication network 200 typically align their local clocks to the extent necessary to ensure that digital messages can be sent and received over the bus 260 so that transmitted bit values align with expected or slotted time intervals for those bits, the ECUs may not need to be synchronized via a centralized clock signal.

An ECU of in-vehicle communication network 200 can include one or more of one or more main processing devices, one or more peripherals, and a transceiver. In some implementations, the main processing device can be a microcontroller, for example, that coordinates activities among various components of ECU, samples values from sensors at the ECU, generates control signals to actuate one or more pneumatic or electromechanical devices of ECU, and/or implements a controller, such as CAN controller. A main processing device may include software, hardware, firmware, or a combination thereof. In some implementations, the controller of the main processing device manages the ECU's communications over bus 260. The controller generates messages for transmission over bus 260 and processes messages received over bus 260.

In some implementations, the transceiver interfaces the main processing device (and controller) with bus 260. For example, the controller may forward messages for transmission over bus 260 to the transceiver via a TX line that connects the main processing device to the transceiver. In some implementations, messages can be communicated to the transceiver from the controller serially as a sequence of binary bit values. The transceiver converts the binary values of messages from controller to corresponding signal levels driven over bus 260 (e.g., a dominant signal with CAN-HI>CAN-LO for logical '0' or a recessive signal with CAN-HI<=CAN-LO for logical '1'). Likewise, the transceiver can detect signals sent from other nodes on bus 260 by reading the voltage or potential differences between lines of bus 260, and their changes over time. In this manner, the transceiver can receive messages that other nodes have transmitted over bus 260. Transceiver forwards messages received over bus 260 to the controller via an RX line running between main processing device and the transceiver. The controller then processes the received message. The transceiver may be implemented as software, firmware, hardware, or a combination thereof. In some implementations, the transceiver is or includes a field-programmable gate array (FPGA) or application-specific integrated circuit (ASIC).

In some implementations, some or all ECUs and other nodes coupled to the bus 260 listen for and receive all messages transmitted over some or part of bus 260. In some implementations, a message sent from one node (e.g., from an ECU) may be broadcast on bus 260. Transmitted messages are typically not intended for all nodes. The controller of the main processing device may evaluate an identifier (e.g., receiver identifier) of the received message to determine whether the received message is relevant to the local ECU. If the message is relevant to ECU, then the main processing device may process and act on the message accordingly. If the message is not relevant to ECU, then the main processing device may discard the message.

In some implementations, the peripherals of an ECU can include sensors, actuators, and the like that enable the ECU to carry out its primary function(s). For example, ECU 202A may be an engine control module, transmission control module, brake control module, steering control module, body control module, or suspension control module that includes (or interfaces with) corresponding sensors and actuators related to the ECU's primary function(s). The primary function(s) of the ECU can relate to the control and/or monitoring of vehicle subsystems that further the operation of the vehicle.

In some implementations, the in-vehicle communication network 200 includes one or more domain control units, such as DCU 242A, DCU 244, and DCU 242B. A DCU can include similar components and perform similar operation as described with respect to ECUs herein, unless otherwise described. DCUs typically manage a particular part (e.g., domain or subdomain) of an in-vehicle communication network 200. In some implementations, a DCU can control, interface or manage one or more ECUs that are part of the DCUs domain or sub-domain. For example, DCU 242B can control, interface or manage with ECU 210B and ECU 212B where the ECU 210B and ECU 212B are the part of the sub-domain managed by DCU 242B. In some implementations, a DCU can function as a gateway device as described above.

In the absence of countermeasures, in-vehicle communication network 200 may be susceptible to attack from one or more attack nodes, such as attack node 254, attack node 256, attack node 252, attack node 258, or attack node 250. In some implementations, an attack node can be any node or component in the in-vehicle communication network 200. For example, an attack node may be an ECU, DCU, AVCS (e.g., the software and/or hardware thereupon) or other type of node that injects illicit signals onto in-vehicle communication network 200. In some implementations, the attack node can be an additional node inserted into the in-vehicle communication network 200, illustrated by attack node 258. Attack node 258 illustrates a man-in-the-middle attack scenario where attack node 258 intercepts, relays and possibly alters the messages (e.g., communications) between two other nodes that believe that they are directly communicating with each other. In some implementations and as illustrated, attack node 258 operating as a man-in-the-middle attack node can be physically inserted between two nodes (e.g., between ECU 202A and AVCS 240A) and/or act as a gateway device. As noted above, illicit signals can include unauthorized or improper signals that interfere with the transmission of legitimate signals, or that fool other nodes into believing that the illicit signal is a legitimate signal that should be acted on accordingly.

In some implementations, one or more nodes of in-vehicle communication network 200 can implement a denial of service module 184. For example, each of ECU 208A, DCU 242A, AVCS 240A, DCU 244, AVCS 240B, and DCU 242B implement an instance of denial of service module 184. In other implementations, any node of in-vehicle communication network 200 can implement a denial of service module 184. In some implementations, denial of service module 184 (e.g., of AVCS 240A) can control the power to a node via a voltage control element (e.g., voltage control 259) in the performance of one or more activities related to a denial of service operation. The denial of service module 184 can perform activities related to a denial of service operation as further described with respect to FIG. 3.

Figure 3:
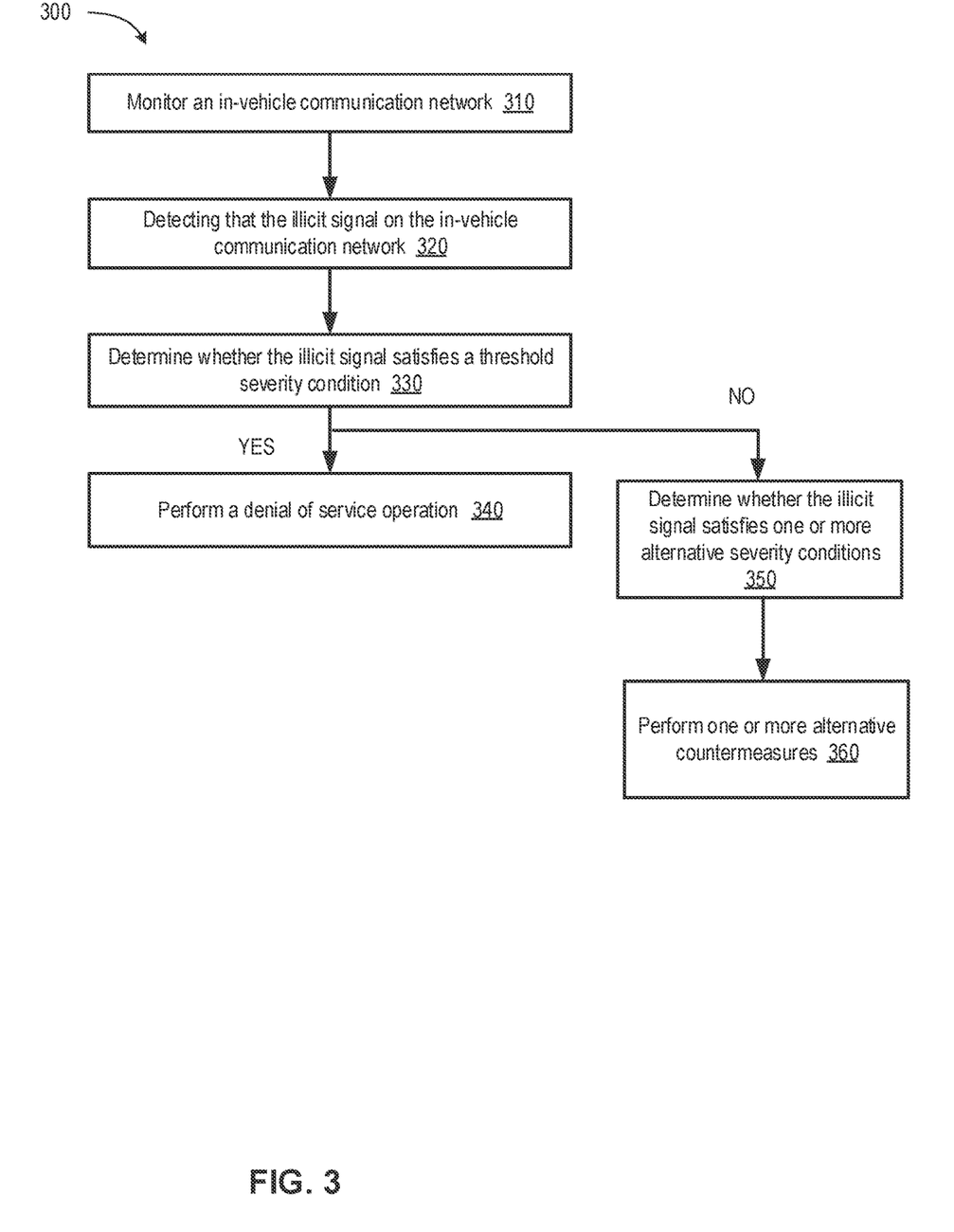
FIG. 3 depicts a flow diagram of an example method of performing a denial of service operation, in accordance with some implementations of the disclosure.

FIG. 3 depicts a flow diagram of an example method 300 of performing a denial of service operation, in accordance with some implementations of the disclosure. Method 300 and/or each of method 300's individual functions, routines, subroutines, or operations can be performed by a processing device, having one or more processing units (CPU) and memory devices communicatively coupled to the CPU(s). In some implementations, method 300 can be performed by a single processing thread or alternatively by two or more processing threads, each thread executing one or more individual functions, routines, subroutines, or operations of the method. The method 300 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 300 is performed by denial of service module 184 described in FIGS. 1 and 2. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible. In some implementations, the same, different, fewer, or greater operations can be performed. Reference is made to elements of FIG. 1 and FIG. 2 to help illustrate the method 300 of FIG. 3.

As illustrated in FIG. 2, one or more nodes of the in-vehicle communication network can implement a denial of service module 184. In some implementations, the method 300 can be performed by each instance of the denial of service module 184.

At operation 310, processing logic monitors the in-vehicle communication network of a vehicle. In some implementations, monitoring the in-vehicle communication network includes receiving a message transmitted at the in-vehicle communication network. In some implementations, monitoring the in-vehicle communication network includes determining one or more message identifiers associated with the message.

As described above, in some implementations, some or all nodes coupled to the bus can listen for and receive all messages transmitted over some or part of the bus (e.g., the part of the bus isolated by a gateway device and on which the particular node is communicatively coupled).

In some implementations, a message (e.g. CAN frame) can include one or more message identifiers (IDs). In some implementations, the message identifiers include a source identifier that identifies the source node (e.g. transmitter) of the message. In some implementations, the message identifiers can include a bus identifier that identifies the bus (e.g., channel) on which the source node resides. In some implementations, the message identifiers can include a content identifier that identifies the content (e.g., payload) of the message. The content of the message can include any type of information including, but not limited to, one or more of action requests (e.g. control commands), action responses, data queries, or data responses. In some implementations, the message identifiers can include a receiver identifier that identifies one or more nodes to which the message is addressed (e.g., CAN acceptance filtering).

As noted above, transmitted messages are typically not intended for all nodes even though, in some instances, the messages are broadcast on the in-vehicle communication network. Every node that receives a message may evaluate whether the message is relevant to the local node. In typical operation, to determine whether the received message is relevant, the node may evaluate the receiver ID of the message to determine whether the node is addressed by the message. If the message is relevant to the node (e.g., addressed to the node), then the node may process and act on the message accordingly. If the message is not relevant to the node, then the node may discard the message and the remaining parts of the message are not read (e.g., other message identifiers are not determined).

In monitoring mode, a node can determine one or more message IDs of the message irrespective of whether or not the message is addressed to the particular node (rather than discarding an irrelevant message as performing in typical operation). In some implementations, in monitoring mode the node can determine the contents of each of the received messages (and in particular, one or more of the source ID or content ID) irrespective of whether or not the messages are addressed to the node. In some implementations, in monitoring mode the node can determine contents of at least some of the messages received irrespective of whether or not the messages are addressed to the node.

In some implementations, monitoring the in-vehicle communication network includes monitoring a vehicle action based on control commands transmitted on the in-vehicle communication network. In some implementations, control commands can be a special type of message that is transmitted by the AVCS. As noted above, control commands can be issued by the AVCS to other systems of the AV (e.g., braking system or steering system) to perform vehicle actions. The AVCS can receive messages on the in-vehicle communication network that continuously report the statuses of vehicle actions (e.g., monitor).

At operation 320, processing logic detects an illicit signal on the in-vehicle communication network.

In some implementations, detecting the illicit signal on the in-vehicle communication network includes identifying a source identifier of the one or more message identifiers and determining whether a source node identified by the source identifier transmitted the message on the in-vehicle communication network. Responsive to determining that source node identified by the source identifier did not transmit the message, processing logic determines the message is an illicit signal (e.g., detects an illicit signal on the in-vehicle communication network). Responsive to making an inconclusive determination as to whether the source node identified by the source identifier transmitted the message, processing logic determines the message is not an illicit signal. Responsive to determining that source node identified by the source identifier did transmit the message, processing logic determines the message is not an illicit signal.

It can be noted that in some implementations, a node, e.g., node A, can verify (e.g., only verify) for itself whether node A did or did not transmit a particular message. That is, a message that uses a source ID from node A, when received by another node, e.g., node B, will appear to node B as trustworthy. However, if node A receives a message that uses a source ID that identifies node A as the source, node A can determine that the message is an illicit signal (e.g., that node A did not transmit the message).

In an illustrative example, multiple nodes that share a bus, can be vulnerable to attackers who use non-compliant ECUs (or other nodes) to illicitly transmit signals using misappropriated message identifiers. An attack node can fraudulently pose (e.g., spoof) as a first (legitimate) node by transmitting a message of a type reserved for transmission by the first legitimate node. In some implementations, a message may be explicitly reserved for a particular node through a formal scheme that assigns source identifiers for exclusive use by individual nodes or groups of nodes to the exclusion of other nodes. For example, the first node may correspond to a LIDAR subsystem of an autonomous vehicle, and the source ID '00000100101' may be registered to the LIDAR subsystem so that only the first node is permitted to transmit messages having that source ID. Other nodes that may be coupled to the same bus would not be permitted to transmit a message using this same source ID because the particular source ID has been explicitly reserved for the first node. This ensures that recipient nodes, upon detecting transmission of a message over the bus having source ID '00000100101' can trust that the message originated from the first node (which actually corresponds to the LIDAR subsystem). In other implementations, a message may be implicitly reserved for a particular node. Implicit reservation does not rely on a formal registration or assignment mechanism to prevent overlap between source IDs reserved for different nodes. However, in practice, it is ensured that the same source identifier is not doubly reserved for two or more nodes in a manner that could lead to conflict. An attacker (e.g., attack node) transmits a message with the '00000100101' source ID that is reserved for the first node over the bus while the first node is in fact idle (e.g., presenting only recessive signals to the bus, or at minimum presenting no dominant signals to the bus). Since other nodes on the bus expect messages with the '00000100101' source ID to originate only from the first node, the attack node may trick other nodes into acting on the fraudulent message.

In some implementations, a node may have memory that stores a record of source identifiers reserved for the local node (e.g., for the node itself). In some implementations, the record may be permanently stored or may be updateable so that source identifiers may be added, removed, or modified from the reserved record. The node may detect the start of a new message (e.g., new message frame), and then read or obtain bit values from the bus that are indicative of the source ID. The node can compare the bit values to the record of reserved source identifiers for the local node. If a similarity (e.g., match) is identified between the source identifier read from the bus and any reserved source identifier, then the node may ignore the message as non-illicit and resume monitoring at the start of the next message frame. However, if a similarity (e.g., match) exists between the source identifier appearing on the bus and a reserved source identifier for the local node, the node can determine that the message is an illicit signal.

In some implementations and as noted above, processing logic can monitor the in-vehicle communication network by monitoring a vehicle action that is performed based on control commands transmitted on the in-vehicle communication network. In some implementations, to detect the illicit signal on the in-vehicle communication network, processing logic determines whether the performance of the vehicle action satisfies a threshold tolerance. Responsive to determining that the performance of the vehicle action does not satisfy the threshold tolerance, processing logic determines that an illicit signal is detected. It can be noted that in such a scenario, processing logic may not have direct access to the bus or be able to directly detect the illicit signal. Processing logic can infer a malicious attack by, for example, using a prediction operation or machine learning model, to determine that the performance of the vehicle action is outside the likelihood of a normal failure and is likely a result of a malicious attack. Responsive to determining that the performance of the vehicle action does satisfy the threshold tolerance, processing logic determines that no illicit signal is detected. In some implementations, the threshold tolerance is the tolerance prescribed by the control command as described above. If the reported status of the vehicle action is outside the tolerance specified by the control command, the vehicle action does not satisfy the threshold tolerance. If the reported status of the vehicle action is within the tolerance specified by the control command, the vehicle action satisfies the threshold tolerance. In some implementations, the threshold tolerance can be different from the tolerance specified by the control command.

At operation 330, processing logic determines whether the illicit signal satisfies a threshold severity condition. In some implementations, if processing logic determines that an illicit signal is detected, the detection of the illicit signal satisfies the threshold severity condition. Processing logic can proceed to operation 340.

In other implementations, a more graduated process can be implemented having multiple severity levels and multiple response levels. Different severity levels can be determined based on the satisfaction of one or more severity conditions. In some implementations, different levels of response can be implemented based on the determined level of severity of the illicit signal. In some implementations, the level of severity can be based, at least in part, on the effect of the illicit signal on vehicle safety. For example, an attack on the air conditioning system can have a lower level of severity than an attack on the steering system. In some implementations, the highest level of severity is represented by the satisfaction of the threshold severity condition. One or more lower levels of severity can be represented by operation 350.

At operation 350, processing logic determines whether the illicit signal satisfies one or more alternative severity conditions (e.g., severity conditions corresponding to one or more lower levels of severity). For the sake of brevity, operation 330 and operation 350 are jointly described below.

In some implementations, to determine whether the illicit signal satisfies the threshold severity condition, processing logic identifies one or more characteristics corresponding to the illicit signal. Processing logic determines that the illicit signal satisfies the threshold severity condition (and/or one or more alternative severity conditions) based on at least one of the one or more characteristics. In some implementations, the one or more characteristics of the illicit signal include one or more of the source ID of the message, the content ID of the message, the receiver ID of the message, a vehicle operation state, or a vehicle authorization state.

The vehicle operation state can indicate the operation of the vehicle (e.g., state indicative of motion of the vehicle). For example, the vehicle operational state can be a parked state or a driving state. In some implementations, the vehicle operational state can be more granular. For example, within the driving state a vehicle can have one or more sub-states such as a coasting state, an accelerating state, a braking state, a turning state, a direction of turning state, a driving forward state, or a driving backwards state, speed state (e.g., the speed of the vehicle), among others. In another example, within the parked state a vehicle can have one or more sub-states such as an engine on state, an engine off state, a brake engaged state, a brake not engaged state, speed state, and so forth.

The vehicle authorization state can indicate the current authorization level of the vehicle. For example, an authorization level can include a test authorization level (e.g., test authorization state) used to perform maintenance, diagnostics, or repair on the vehicle. In another example, an authorization level can include an active authorization level (e.g., active authorization state) used when the vehicle is enabled for general operation (e.g., normal driving or operation).

In some implementations, to determine whether the illicit signal satisfies the threshold severity condition (and/or one or more alternative severity conditions), processing logic can evaluate one or more of the characteristics to determine whether the one or more characteristics satisfy the threshold severity condition (and/or one or more alternative severity conditions). It can be noted that examples of determining whether illicit signals satisfy the threshold severity condition are provided herein for purposes of illustration, rather than for limitation. It can be further noted that any of the characteristics or combination thereof can be used to determine whether illicit signals satisfy the threshold severity condition and/or satisfy one or more alternative severity conditions.

In an illustrative example, an illicit signal is determined based on a fraudulent source ID. Processing logic can determine whether one or more of the source ID or content ID of the message is associated with a safety-critical system or safety-critical operation. If processing logic determines that the message is associated with a safety-critical system or operation based on one or more of the source ID or content ID, processing logic determines that the illicit signal satisfies the threshold severity condition. If processing logic determines that the message is not associated with a safety-critical system or operation based on one or more of the source ID or content ID, processing logic determines that the illicit signal does not satisfy the threshold severity condition. In some implementations, if processing logic determines that the illicit signal does not satisfy the threshold severity condition, processing logic determines whether the illicit signal satisfies one or more of the alternative severity conditions based on the one or more of the source ID or content ID.

For example, if one or more of the source ID is from a node that operates in a non-critical system (e.g., interior light system or windows) or the content ID identifies a non-safety critical operation (e.g., open a window), processing logic may determine that the illicit signal does not satisfy the threshold severity condition, but satisfies an alternative severity condition of a lower severity level. If one or more of the source ID is from a node that operates in a safety-critical system (e.g., steering system, braking system, engine system, exterior lights system, or airbag system) or the content ID identifies a safety-critical operation (e.g., steering, braking, engine, or airbag operation), processing logic can determine that the illicit signal satisfies the threshold severity condition.

In another example where the illicit signal is detected based on whether the performance of the vehicle action satisfies a threshold tolerance a similar evaluation of characteristics, as described above, can be performed by processing logic. In some implementations, processing logic can determine one or more of the vehicle system or vehicle operation that does not satisfy the threshold tolerance. If one or more of the vehicle systems is a safety-critical system or the vehicle operation is a safety-critical operation, processing logic can determine that the illicit signal satisfies the threshold severity condition. If one or more of the vehicle systems is not a safety-critical system or the vehicle operation is not a safety-critical operation, processing logic can determine that the illicit signal does not satisfy the threshold severity condition. In some implementations, if processing logic determines that the illicit signal does not satisfy the threshold severity condition, processing logic determines whether the illicit signal satisfies one or more of the alternative severity conditions.

In some implementations, processing logic can also evaluate the operational state of the vehicle in determining whether the illicit signal satisfies the threshold severity condition (and/or one or more alternative severity conditions). If the vehicle is parked, the systems or operations that are considered safety critical can be different (e.g., fewer) than if the vehicle is in motion (e.g., driving). By using the operational state, processing logic can determine whether the illicit signal satisfies the threshold severity condition (and/or one or more alternative severity conditions) in a similar manner as described above, but takes into account the specified safety-critical systems or operations for a particular operational state.

In some implementations, processing logic can also evaluate the vehicle authorization state in determining whether the illicit signal satisfies the threshold severity condition (and/or one or more alternative severity conditions). If the vehicle is in a test authorization state, the systems or operations that are considered safety critical can be different (e.g., fewer) than if the vehicle is in another state, such as the active authorization state. By evaluating the authorization state, processing logic can determine whether the illicit signal satisfies the threshold severity condition (and/or one or more alternative severity conditions) in a similar manner as described above, but takes into account the specified safety-critical systems or operations for a particular authorization state.

At operation 340, processing logic performs a denial of service operation. As noted above, a denial of service operation can refer to a countermeasure operation that disables communication on at least part of the in-vehicle communication network affected by the illicit signal. Part of the in-vehicle communication network can refer to one or more nodes of the in-vehicle communication network, part of the physical bus (e.g., network link) between two or more nodes, or communication between two or more nodes using the bus. In some implementations, a denial of service operation can include a node-based denial of service operation where one or more nodes are disabled (e.g., the voltage supply to the one or more nodes is changed to 0 volts). In some implementations, a denial of service operation can include a network-based denial of service operation where communication between two or more nodes is disabled (e.g., at least part of the network bus is pulled to fixed voltage potential, such as 0V or 5V, prohibiting messages to be communicated on at least part of the bus). Reference to a denial of service operation can refer to one or more of a node-based denial of service operation or a network-based denial of service operation, unless otherwise described. It can be noted that a countermeasure operation is actively performed by a component of the AV, rather than by a malicious attacker, such as an attack node.

In some implementations, the denial of service operation can disable a part of the in-vehicle communication network such that some of the functionality of the in-vehicle communication network (and hence functionality of the respective vehicle system(s)) is reduced. The denial of service operation can target the specific part(s) of the in-vehicle communication network that are impacted by the illicit signal such that other parts of the in-vehicle communication network remain functional.

In some implementations, the denial of service operation causes the vehicle to be disabled (i.e., the vehicle is prevented from further driving or engine startup). For example, the denial of service operation can disable one or more of the powertrain system, a power supply, or any one of the systems coupled to the in-vehicle communication network. In an exemplary illustration, the denial of service operation can cause a moving vehicle to coast and pull to the side of the road after which the engine is shut off and the vehicle is prevented from restarting.

In some implementations, the denial of service operation includes at least reducing power (e.g. power reduction operation) to at least part of the in-vehicle communication network to prevent communication on at least part of the in-vehicle communication network affected by the illicit signal. In some implementations, a power reduction operation can include at least a partial reduction in power, and in some cases, a full reduction of power at one or more nodes (or a component thereof) of the in-vehicle communication network. In an illustrative example, the power to a particular DCU that detects or is affected by the illicit signal can have its power supply turned off or power to the main processing device of the particular DCU can be turned off. For example, AVCS 240A of FIG. 2 can control the power (e.g., voltage) supplied to ECU 202A using voltage control 259. In some implementations, the power reduction operation can be performed by disconnecting a power supply from one or more nodes using a switch or other type of physical or electrical disconnection. In some implementations, the denial of service operation can include an action that decouples the bus from respective nodes on at least part of the in-vehicle communication network.

In some implementations, performing a denial of service operation includes a flooding operation that floods at least part of the in-vehicle communication network with signals that prevent additional illicit signals from being communicated between nodes in at least part of the in-vehicle communication network. The flooding operation can be a countermeasure, as described herein. For example, in some implementations, processing logic generates signals to flood at least part of the in-vehicle communication network. Processing logic transmits the signals on at least part of the in-vehicle communication network affected by the illicit signal to flood at least the part of the in-vehicle communication network. The flood of signals prevents the communication of additional illicit signals between nodes in at least the part of the in-vehicle communication network. In some implementations, the flood operation disables the vehicle.

In some implementations, the vehicle is an autonomous vehicle, In some implementations, in-vehicle communication network comprises a redundant system including a first vehicle sub-system (e.g., system or subsystem) and a second vehicle sub-system (e.g., system or subsystem) configured to perform redundant vehicle operations using the in-vehicle communication network. The denial of service operation disables at least part of the first vehicle sub-system that is affected by the illicit signal and enables at least part of the second vehicle sub-system to perform the redundant vehicle operations that were previously performed by the first vehicle sub-system. It can be noted that in some implementations disabling a part of the in-vehicle communication network can disable at least part of the first vehicle sub-system that is affected by the illicit signal. In some implementations, disabling a part of the first vehicle sub-system causes the respective redundant sub-system (e.g., second vehicle sub-system) to be enabled and to perform the functionality previously performed by the first vehicle sub-system.

The following examples of method 300 are provided using elements of FIG. 2. AVCS 240A monitors Domain A for illicit signals and detects an illicit signal at Domain A. In the current example, attack node 254 is spoofing AVCS 240A. AVCS 240A may not know which node of Domain A is the attack node because, for example, the message (e.g., encrypted message) is not authenticated or the legitimacy of the message cannot be determined. In some implementations, responsive to detecting the illicit signal, AVCS 240A can disable Domain A and send a signal that enables AVCS 240B to take over control of the vehicle using the nodes of Domain B. Alternatively, AVCS 240B can disable bus 260A and the nodes thereon and operate the vehicle using bus 260B and the nodes thereon (e.g., Domain B).

In another example, AVCS 240A detects the illicit signal by determining that the performance of a vehicle action does not satisfy a threshold tolerance. AVCS 240A may have greater resolution as to which node is affected by the illicit signal than in the above example. For instance, DCU 242A can control the braking system of the vehicle. If the AVCS 240A determines that braking vehicle actions are outside a threshold tolerance, AVCS 240A can perform a denial of service operation targeting DCU 242A. For example, AVCS 240A can disable DCU 242A by one or more techniques including causing a disconnection of power to DCU 242A (e.g., disconnecting the voltage supplied to the node or pulling the voltage supplied to the node to a ground potential). In another example, AVCS 240A could invoke a flooding operation that floods bus 260 with signals or causes DCU 242A to flood its respective sub-domain (e.g., DCU 242A implemented as a gateway device and the sub-network controlled by DCU 242A includes DCU 242A, attack node 256, and ECU 212A) with signals. AVCS 240A can also enable DCU 242B and operate the vehicle using redundant vehicle operations performed by DCU 240B. In another example, AVCS 240A can disable the transmission of messages on bus 260A by pulling the voltage of at least part of the bus (e.g., bus 260A) to a fixed voltage potential (e.g., a ground potential or 5 Volts) such voltage signal differentiation on cannot be performed.

In another example, DCU 242A acts as a gateway device and monitors for illicit signals on the respective sub-domain. DCU 242A detects an illicit signal at its sub-domain. In the current example, attack node 256 is spoofing DCU 242A. DCU 242A may not know which node of the respective sub-domain is the attack node because such an identifier is not made available in the illicit signal. In some implementations, DCU 242A can disable itself. In some implementations, DCU 242A can send a message to AVCS 240A informing AVCS 240A of the illicit signal. For example, DCU 242A can have multiple independent processing devices and the denial of service module (e.g., denial of service module 184) operates on a separate secured one of the independent processing devices such that messages sent by DCU 242 to AVCS 240A can be trusted to be non-compromised messages. AVCS 240A can perform a denial of service operation specifically targeting DCU 242A (and/or the respective sub-domain) or disable the entirety of Domain A. Domain B can be enabled and the operation of the vehicle can be performed using Domain B. In an alternative response, both Domain A and Domain B can be disabled, which can result in the entire vehicle being disabled. In some implementations, a separate module (e.g., emergency module) that performs a limited set of operations can be activated if all the systems are disabled. The emergency module can perform the operations, for example, to safely control the vehicle to the side of the road or other operations. In some implementations, the safety module can be on a separate network from the in-vehicle communication network.

In another example, AVCS 240A detects an illicit message on bus 260C that satisfies a threshold severity condition. Since the attack is at a common domain there may not be a redundant system that can perform vehicle operations that are affected by the illicit signal. AVCS 240A may perform a denial of service operation that disables the vehicle.

In another example, attack node 258 operates as a man-in-the-middle attack node and intercepts messages between ECU 202A and at least AVCS 240A. In such a scenario, AVCS 240A can perform a denial of service operation by disconnecting power to ECU 202A by for example, using a voltage control that operates a switch to disconnect ECU 202A from a respective operating voltage source or using the voltage control to change the operating voltage from an operating voltage to a non-operating voltage, such as a ground potential.

At operation 360, processing logic performs one or more alternative countermeasures. In some implementations, the one or more alternative countermeasures can include delaying a countermeasure response for a predetermined amount of time. In some implementations, processing logic can continue to monitor the in-vehicle communication network for the predetermined amount of time. If another illicit signal is detected during the predetermined amount of time, processing logic can execute method 300 as described herein or automatically determine that that the illicit signal satisfies the threshold severity condition (operation 330) and continue with method 300 as described. If no other illicit signal is detected during the predetermined amount of time, processing logic can continue to execute method 300 as described herein.

In some implementations, the one or more alternative countermeasures can include sending an indication of the illicit signal to a remote server, such as AV server 150 of FIG. 1. In some implementations, the remote server can make a determination on the illicit signal and send a response to AV 101 directing the AV to perform a particular countermeasure (if any).

In some implementations, the one or more alternative countermeasures can include directing the vehicle to pull over to the side of the road for a predetermined duration. In an AV vehicle, the AVCS can control vehicle actions that cause the vehicle to pull over to the side of the road.

Figure 4:
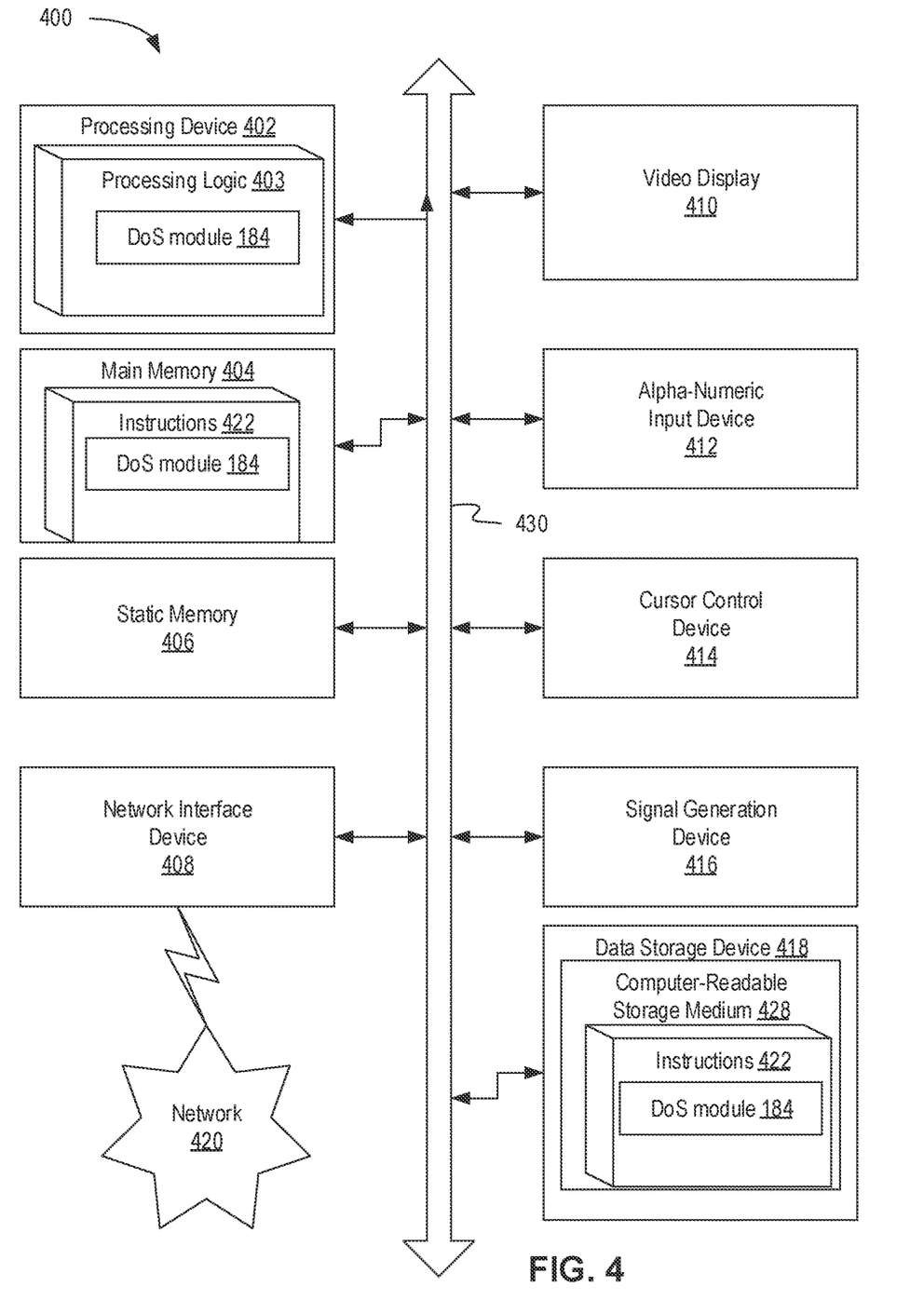
FIG. 4 depicts a block diagram of an example computer device within which a set of instructions, for causing the machine to perform any of the one or more methodologies discussed herein can be executed, in accordance with some implementations of the disclosure.

FIG. 4 depicts a block diagram of an example computer device 400 within which a set of instructions, for causing the machine to perform any of the one or more methodologies discussed herein can be executed, in accordance with some implementations of the disclosure. Example computer device 400 can be connected to other computer devices in a LAN, an intranet, an extranet, and/or the Internet. Computer device 400 can operate in the capacity of a server in a client-server network environment. Computer device 400 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 400 can include a processing device 402 (also referred to as a processor or CPU), which can include processing logic 403, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory (e.g., a data storage device 418), which can communicate with each other via a bus 430.

Processing device 402 represents one or more general-purpose processing devices such as a microprocessor, central processing unit, or the like. More particularly, processing device 402 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 402 can be configured to execute instructions performing any of the operations performed by denial of service module 184.

Example computer device 400 can further comprise a network interface device 408, which can be communicatively coupled to a network 420. Example computer device 400 can further comprise a video display 410 (e.g., a liquid crystal display (LCD), a touch screen, or a cathode ray tube (CRT)), an alphanumeric input device 412 (e.g., a keyboard), a cursor control device 414 (e.g., a mouse), and an acoustic signal generation device 416 (e.g., a speaker).

Data storage device 418 can include a computer-readable storage medium (or, more specifically, a non-transitory computer-readable storage medium) 428 on which is stored one or more sets of executable instructions 422. In accordance with one or more aspects of the disclosure, executable instructions 422 can comprise executable instructions to perform any of the operations of denial of service module 184.

Executable instructions 422 can also reside, completely or at least partially, within main memory 404 and/or within processing device 402 during execution thereof by example computer device 400, main memory 404 and processing device 402 also constituting computer-readable storage media. Executable instructions 422 can further be transmitted or received over a network via network interface device 408.

While the computer-readable storage medium 428 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

I claim:
1. A method, comprising:
monitoring an in-vehicle communication network of a vehicle;
detecting an illicit signal on the in-vehicle communication network;
determining, by a processing device, whether the illicit signal satisfies a threshold severity condition; and
responsive to determining that the illicit signal satisfies the threshold severity condition, performing a denial of service (DoS) operation with respect to at least part of the in-vehicle communication network, wherein the DoS operation renders inoperable communication on at least part of the in-vehicle communication network affected by the illicit signal.

2. The method of claim 1, wherein the vehicle is an autonomous vehicle, and wherein the in-vehicle communication network comprises a redundant system comprising a first vehicle sub-system and a second vehicle sub-system configured to perform redundant vehicle operations using the in-vehicle communication network, wherein performing the DoS operation comprises:
disabling at least part of the first vehicle sub-system that is affected by the illicit signal while at least part of the second vehicle sub-system is enabled to perform the redundant vehicle operations that were previously performed by the first vehicle sub-system.

3. The method of claim 1, wherein performing the DoS operation causes a reduction in functionality of the vehicle.

4. The method of claim 1, wherein performing the DoS operation comprises reducing power to the at least part of the in-vehicle communication network to prevent communication on the at least part of the in-vehicle communication network affected by the illicit signal.

5. The method of claim 4, wherein reducing the power to the at least part of the in-vehicle communication network comprises reducing the power to a node of the in-vehicle communication network.

6. The method of claim 4, wherein performing the DoS operation comprises:
applying a fixed voltage to the at least part of a bus of the in-vehicle communication network.

7. The method of claim 1, wherein performing the DoS operation comprises:
generating a plurality of signals to flood the at least part of the in-vehicle communication network; and
transmitting the plurality of signals on the at least part of the in-vehicle communication network affected by the illicit signal to flood the at least part of the in-vehicle communication network with the plurality of signals.

8. The method of claim 1, wherein monitoring the in-vehicle communication network comprises:
receiving a message transmitted at the in-vehicle communication network;
determining one or more message identifiers associated with the message; and
wherein detecting the illicit signal on the in-vehicle communication network comprises:
identifying a source identifier of the one or more message identifiers; and
determining whether a source node identified by the source identifier transmitted the message on the in-vehicle communication network, wherein the illicit signal is detected by determining that the source node identified by the source identifier did not transmit the message.

9. The method of claim 8, wherein determining that the illicit signal satisfies the threshold severity condition comprises:
- identifying one or more characteristics corresponding to the illicit signal; and
- determining that the illicit signal satisfies the threshold severity condition based on the one or more characteristics corresponding to the illicit signal.

10. The method of claim 9, wherein the one or more characteristics corresponding to the illicit signal comprise at least one of the source identifier of the message, a content identifier of the message, a vehicle operational state, or a vehicle authorization state.

11. The method of claim 1, wherein monitoring the in-vehicle communication network comprises:
- monitoring a vehicle action that is performed based on control commands transmitted on the in-vehicle communication network.

12. The method of claim 11, wherein detecting the illicit signal on the in-vehicle communication network comprises:
- determining whether the performance of the vehicle action satisfies a threshold tolerance, wherein the illicit signal is detected responsive to determining that the performance of the vehicle action does not satisfy the threshold tolerance.

13. A system, comprising:
- a memory; and
- a processing device, coupled to the memory, to:
  - monitor an in-vehicle communication network of a vehicle;
  - detect an illicit signal on the in-vehicle communication network;
  - determine whether the illicit signal satisfies a threshold severity condition; and
  - responsive to determining that the illicit signal satisfies the threshold severity condition, perform a denial of service (DoS) operation with respect to at least part of the in-vehicle communication network, wherein the DoS operation renders inoperable communication on at least part of the in-vehicle communication network affected by the illicit signal.

14. The system of claim 13, wherein the vehicle is an autonomous vehicle, and wherein the in-vehicle communication network comprises a redundant system comprising a first vehicle sub-system and a second vehicle sub-system configured to perform redundant vehicle operations using the in-vehicle communication network, wherein to perform the DoS operation, the processing device to:
- disable at least part of the first vehicle sub-system that is affected by the illicit signal while at least part of the second vehicle sub-system is enabled to perform the redundant vehicle operations that were previously performed by the first vehicle sub-system.

15. The system of claim 13, wherein to perform the DoS operation, the processing device to: reduce power to at least part of the in-vehicle communication network to prevent communication on the at least part of the in-vehicle communication network affected by the illicit signal.

16. The system of claim 13, wherein to perform the DoS operation, the processing device to:
- generate a plurality of signals to flood the at least part of the in-vehicle communication network; and
- transmit the plurality of signals on the at least part of the in-vehicle communication network affected by the illicit signal to flood the at least part of the in-vehicle communication network with the plurality of signals.

17. A non-transitory computer-readable medium comprising instructions that, responsive to execution by a processing device, cause the processing device to perform operations comprising:
- monitoring an in-vehicle communication network of a vehicle;
- detecting an illicit signal on the in-vehicle communication network;
- determining whether the illicit signal satisfies a threshold severity condition; and
- responsive to determining that the illicit signal satisfies the threshold severity condition, performing a denial of service (DoS) operation with respect to at least part of the in-vehicle communication network, wherein the DoS operation renders inoperable communication on at least part of the in-vehicle communication network affected by the illicit signal.

18. The non-transitory computer-readable medium of claim 17, wherein the vehicle is an autonomous vehicle, and wherein the in-vehicle communication network comprises a redundant system comprising a first vehicle sub-system and a second vehicle sub-system configured to perform redundant vehicle operations using the in-vehicle communication network, wherein to perform the DoS operation, the operations comprising:
- disabling at least part of the first vehicle sub-system that is affected by the illicit signal while at least part of the second vehicle sub-system is enabled to perform the redundant vehicle operations that were previously performed by the first vehicle sub-system.

19. The non-transitory computer-readable medium of claim 17, wherein performing the DoS operation causes a reduction in functionality of the vehicle.

20. The non-transitory computer-readable medium of claim 17, wherein to perform the DoS operation, the operations comprising reducing power to the at least part of the in-vehicle communication network to prevent communication on the at least part of the in-vehicle communication network affected by the illicit signal.

* * * * *